Dec. 10, 1940. T. B. FLANAGAN 2,224,812
WEIGHING SCALE
Filed May 10, 1938 3 Sheets-Sheet 1

INVENTOR
Thomas B. Flanagan.
BY
ATTORNEYS

INVENTOR
Thomas B. Flanagan.
BY
ATTORNEYS

Dec. 10, 1940.　　　T. B. FLANAGAN　　　2,224,812
WEIGHING SCALE
Filed May 10, 1938　　　3 Sheets-Sheet 3
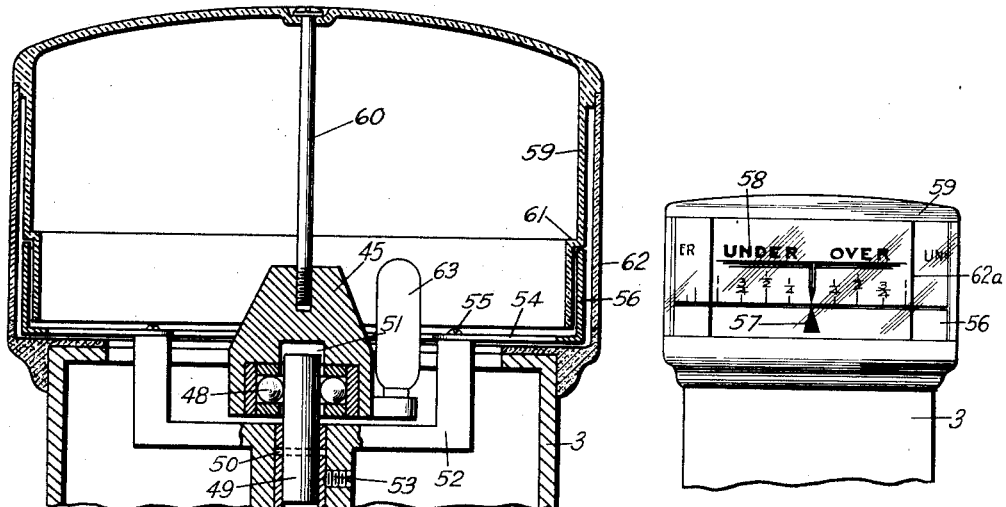
Fig. 5
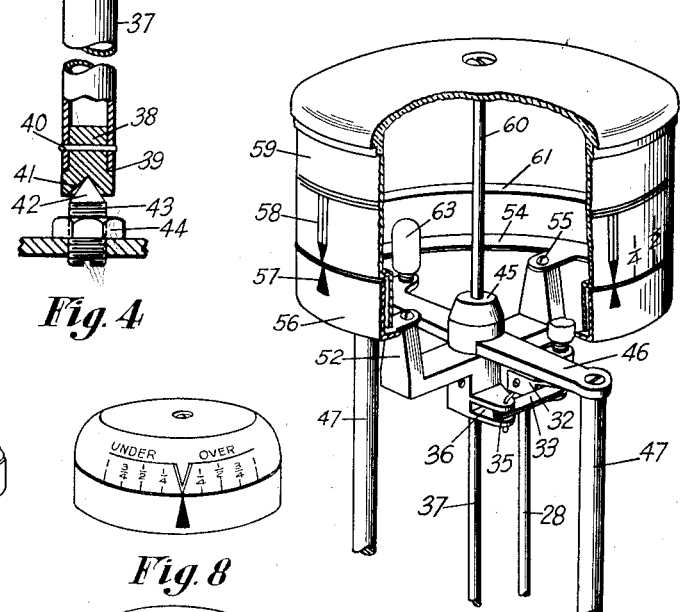
Fig. 4
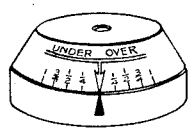
Fig. 7
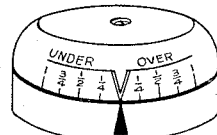
Fig. 8
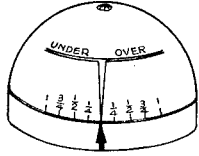
Fig. 9
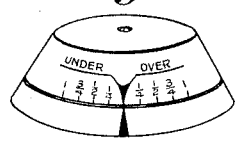
Fig. 10
Fig. 6
INVENTOR
Thomas B. Flanagan.
BY Corbett & Mahoney
ATTORNEYS Patented Dec. 10, 1940

2,224,812

UNITED STATES PATENT OFFICE 2,224,812

WEIGHING SCALE

Thomas B. Flanagan, Columbus, Ohio, assignor to The Exact Weight Scale Company, Columbus, Ohio, a corporation of Ohio Application May 10, 1938, Serial No. 207,066

4 Claims. (Cl. 265—58)

My invention relates to a weighing scale. It has to do, more particularly, with that type of weighing scale commonly referred to as an over-and-under weight scale, although there are features of my invention not necessarily limited thereto.

One of the objects of my invention is to provide a weighing scale which has associated therewith indicating mechanism of such a nature that it is visible and can be read at any position around the weighing scale.

Another object of my invention is to provide a weighing scale of the type indicated wherein the indicating mechanism and the operating means therefor are simple and efficient and are of such a nature that the indicating mechanism will be extremely accurate.

Another object of my invention is to provide a scale of the type indicated provided with indicating mechanism and operating means therefor which are composed of a minimum number of parts so that friction and wear will be reduced to a minimum and which are of such a nature that expansion and contraction caused by changes in temperature will have substantially no effect on the operation thereof.

Another object of my invention is to provide a weighing scale of the type indicated which has resistance elements associated therewith for normally maintaining the beam in balanced position which are arranged in a novel and effective manner.

Another object of my invention is to provide a scale of the type indicated which has a novel and efficient type of check rod associated therewith.

In its preferred form my invention contemplates the provision of a weighing scale of the over-and-under type which embodies mainly weighing mechanism and indicating mechanism. The weighing mechanism includes a beam fulcrumed for movement in a vertical plane which carries out-rider members adjacent its opposite ends that are pivotally connected thereto. A novel type of check rod is associated with the out-rider elements for maintaining them vertical during the swinging movements of the beam. One of the out-rider elements carries a weight-receiving platter and the other out-rider element carries a commodity-receiving pan. I provide resistance elements for resisting movement of the beam away from balanced position. These resistance elements take the form of leaf springs which are bowed into substantially U-form and one of which is disposed beneath the beam adjacent each end thereof. These resistance elements serve to effectively resist the movement of the beam away from balanced position and to return it to balanced position after it has moved away from such position.

The indicating mechanism which I provide is associated with the beam and is adapted to indicate when the beam is in balance or when it has moved away from balanced position in either direction. This indicating mechanism is disposed in a tower which is supported on the scale at a point intermediate the ends of the beam and adjacent the fulcrum point thereof. The indicating means embodies a rotatable indicator which is mounted in the top of the tower and cooperates with a stationary chart disposed adjacent thereto in the tower. The rotatable indicator is provided with a number of pointers and the stationary chart is divided into a corresponding number of sections at least one of which can be seen from any point around the scale. The rotatable indicator is carried on the upper end of a vertical shaft which is rotatably mounted within the tower. A suitable connection is provided between the rotatable shaft and the beam so that when the beam swings about its fulcrum, the shaft will be rotated or oscillated about its own axis. Thus, the position of the beam will be indicated by the indicating mechanism.

The preferred embodiment of my invention is illustrated in the accompanying drawings wherein similar characters of reference designate corresponding parts and wherein:

Figure 1a is a perspective view, partly broken away, illustrating a portion of the check rod structure.

Figure 4 is a detail mainly in section of the indicating means and associated parts.

Figure 5 is a side elevation of the upper end of the indicator tower showing one of the sections of the chart and the cooperating pointer.

Figure 6 is a detail in perspective, partly broken away, of the upper end of the tower showing the indicating means and associated parts.

Figure 1:
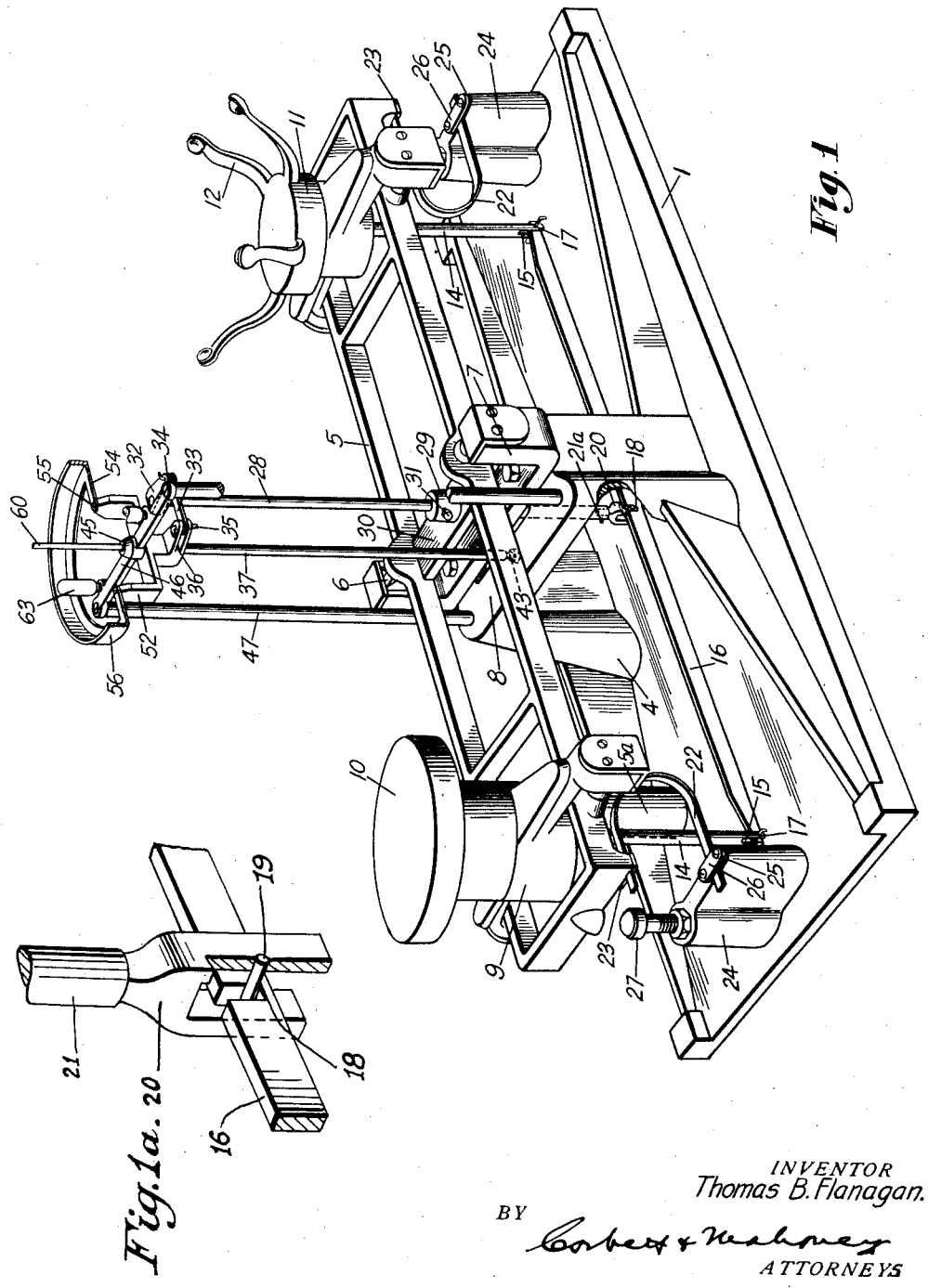
Figure 1 is a perspective view of a weighing scale made in accordance with my invention and with the housing removed to show the operating parts thereof.
Figure 2:
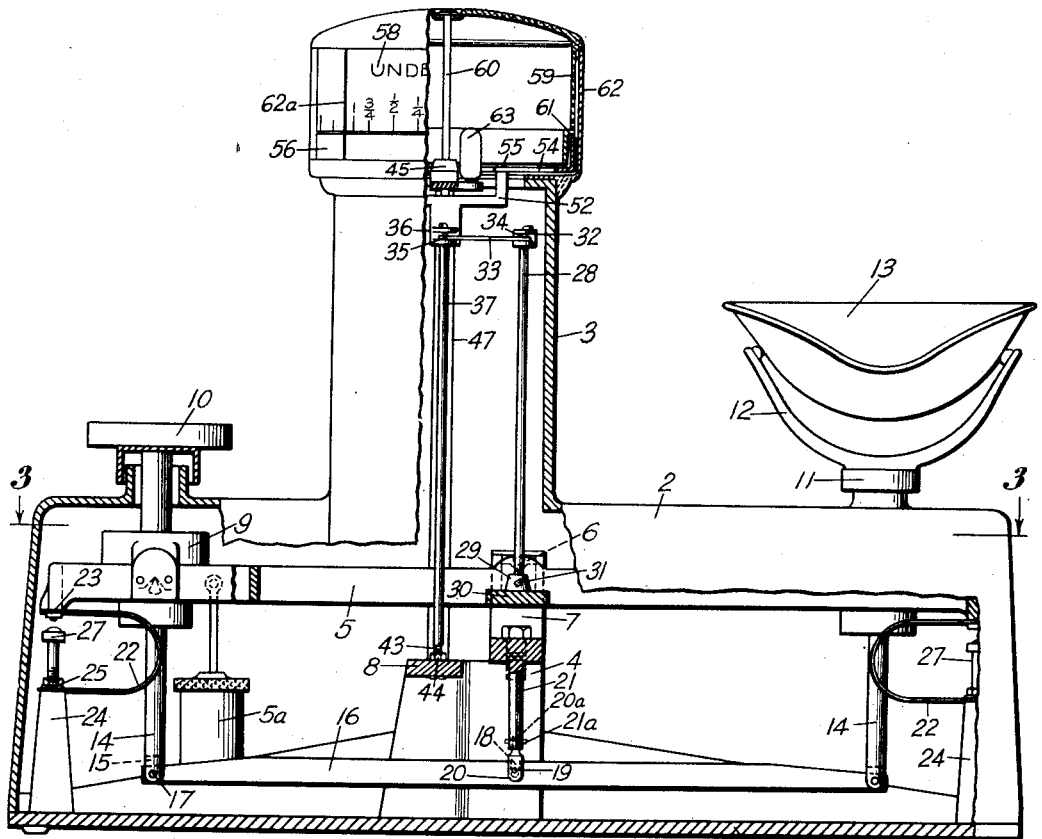
Figure 2 is a view of the complete scale which is partly in side elevation and partly in section.
Figure 3:
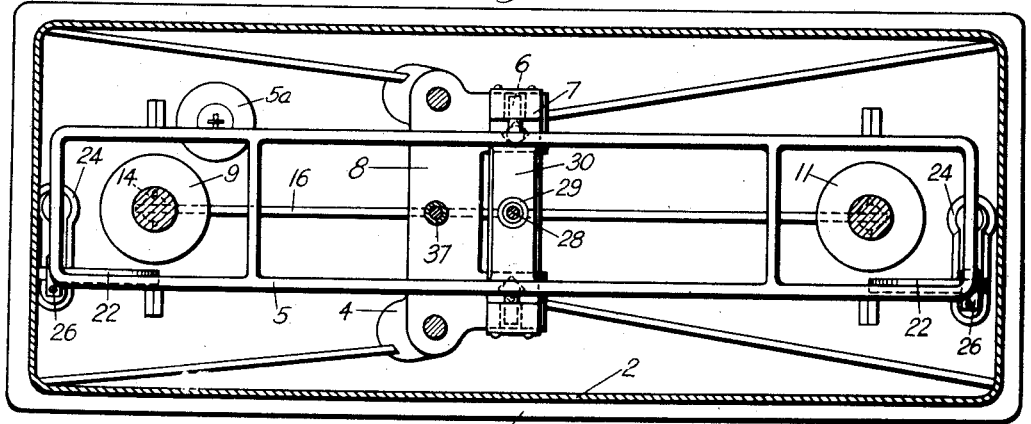
Figure 3 is a horizontal section taken through the scale illustrated in Figure 2 substantially along line 3—3.

Figures 7 to 10, inclusive, are views in perspective illustrating different shapes which the rotatable indicator and the stationary chart member may have.

With reference to the drawings I have illustrated my weighing scale as comprising a base 1 which supports the operating mechanism of the scale. A housing 2 rests on the base 1 and encloses the operating mechanism of the scale. This housing has an integral upwardly projecting tower or indicator housing 3 which is formed on the housing 2 intermediate the ends thereof.

The base 1 is provided with an integral upstanding supporting standard 4 which has a transversely extending portion 8 on its upper end. An even balance beam 5 is pivotally carried by means of knife-edge pivots 6 which fit into V-bearings carried by a U-shaped fulcrum member 7. The member 7 is suitably secured to the upper end of the standard 4 to one side of the portion 8 of the standard. Thus, the beam is fulcrumed for rocking movement in a vertical plane. The beam has an out-rider element 9 mounted thereon adjacent one end thereof by means of knife-edge pivots carried by the beam and V-bearings carried by the out-rider. This out-rider element carries a weight-receiving platter 10 on its upper end. The opposite end of the beam has an out-rider element 11 mounted thereon by means of knife-edge pivots and V-bearings and this out-rider element carries on its upper end supports 12 which receive and support a removable commodity receiving pan 13. The upper ends of these supports are disposed at the corners of a square so that the pan 13 may be supported in any position thereon.

In order to maintain the out-rider elements 9 and 11 vertical at all times during rocking of the beam, I provide a novel type of check rod structure. It will be noted that each of the out-rider elements is provided with a depending rod 14. Each rod is bifurcated at its lower end as at 15 so that it will receive the end of a check rod 16. The end of the check rod is pivotally connected to the bifurcated end of the rod 14 by means of a pin 17 passing through aligning openings formed in such members. The rod 16 is made of a flat strip of metal. Midway between its ends and formed in its upper edge is an open-ended slot 18. This slot 18 cooperates with a transversely extending pin 19 which is carried by a yoke member 20 that straddles the rod 16. This yoke member has an integral extension or pin 20a that fits into a socket formed in the lower end of a member 21 and is held therein by pin 21a. The member 21 is integral with the U-shaped fulcrum member 7 and extends downwardly therefrom. Because I provide an open-ended slot in the edge of the check rod, the entire check rod can be of hardened steel and the slot can be milled in from the edge of the rod and can be formed more accurately and more easily than if a slot having closed ends were used.

In order to resist movement of the beam away from balanced position, I provide a resistance element adjacent each end of the beam. As indicated in the drawings, each resistance element embodies a spring 22. The spring 22 is a flat strip of resilient metal which is bowed into substantially U-form or loop form. As indicated, one end of the U-shaped spring 22 is secured to the beam as at 23 while its opposite end is secured to a stationary support 24 as at 25. The support 24 is integral with the base 1. It will be noted that each end of the spring is clamped in position by a removable clamping member 26.

The resistance offered by the spring may be readily adjusted by loosening either clamp and varying the effective length of the spring. I have found that it is very desirable to have these springs located directly adjacent the ends of the beam because this results in a reduction in the amount of vibration in the scale and also, due to increased leverage, makes them more effective. The support 24 has an up-standing stop 27 which will limit downward movement of the corresponding end of the beam. The stop 27 has a rubber cap and its lower end is adjustably threaded into support 24 but is normally locked in adjusted position by a lock nut.

A dashpot 5a is supported on the base 1 and is connected to the beam 5. This dashpot is preferably of the permanently set non-adjustable type. As previously indicated, I provide a novel type of indicating mechanism for indicating whether or not the beam is in balance. This indicating mechanism is disposed within the upper end or dome of the tower and the operating means therefor extends through the tower.

The indicating mechanism includes an up-standing rocker arm 28. This rocker arm 28 is rigidly mounted on the beam 5 by means of a socket member 29 secured to a transverse member 30 forming part of the beam. The arm 28 is maintained in the socket 29 by means of a set-screw 31. The rocker arm 28 is secured to the beam rigidly and is perpendicular thereto. Thus, when the beam swings in a vertical plane the upper end of the rocker arm will be oscillated. The upper end of the rocker arm 28 has a crank arm 32 keyed thereon in such a manner that it will not rotate on the rocker arm. The outer end of this crank arm is bifurcated and receives the end of a push-and-pull rod or link 33. The end of this link is pivotally connected as at 34 to the bifurcated end of the crank arm by means of a pin passing through aligning openings formed in these members. The opposite end of the link 33 is similarly pivotally connected as at 35 to a bifurcated crank arm 36. This crank arm 36 is mounted on a vertically disposed shaft 37 in a manner which will be apparent.

The shaft 37 is rotatably supported and rotation thereof is adapted to actuate the indicating means to be described hereinafter. The shaft 37 is in the form of a tube and a bearing member 38 (Figure 4) is disposed in the lower end thereof. This bearing member is provided with a shoulder 39 which cooperates with the end of the tubular shaft to limit movement of the member 38 into the shaft. This member 38 is provided with a transverse hole with which a transverse pin 40 carried by the hollow shaft cooperates to prevent rotation of the bearing member in the tubular shaft. The lower end of the bearing member 38 has a conical socket 41 formed therein which receives a conical point 42 formed on a bearing member 43. This bearing member 43 is threaded into the support 8 and is locked in position by a lock nut 44. It will be apparent that the member 43 may be adjusted so that it can project to various extents above the top surface of the support 8. As indicated in Figure 4 the surfaces of the socket 41 and the point 42 are at different angles so that only the point of the member 42 will contact with the surface of the socket. This will reduce friction to a minimum.

The upper end of the shaft 37 is rotatably supported by a bearing structure 45 which is carried by a supporting arm 46. The supporting arm 46 extends transversely of the scale and is supported on the upper end of a pair of upstanding rods 47. These rods 47 have their lower ends secured to the transversely extending support 8. The bearing structure 45 has a socket in its lower end which receives a ball bearing structure 48. The balls of this structure contact with a cylindrical bearing member 49. This member 49 has its lower end extending into the upper end of the shaft 37. The lower end of this member is provided with a transverse hole with which a transverse pin 50 cooperates in order to prevent rotation of member 49 relative to the shaft 37. A space 51 is provided in the member 45 above the member 49 to permit upward movement of this member when the shaft 37 expands. When the shaft does expand it will not effect operation of the indicating mechanism since it will merely force the member 49 up through the ball bearing structure 48 and into the space 51. Also, when the shaft 37 contracts the member 49 will merely move downwardly relative to the ball bearing 48. Thus, expansion and contraction will have no effect on the rotation of the shaft 37.

Adjacent its upper end the shaft 37 carries a U-shaped support 52. This U-shaped support 52 is keyed to the shaft 37 by means of a screw 53. The crank arm 36 is integral with member 52. It will be noted from Figure 4 that the horizontal portion of the support 52 is spaced from the bearing member 45 and the upper end of shaft 37 is flush with such portion so as not to interfere with expansion and contraction of the shaft 37. The upper ends of the support 52 have an indicator member 54 secured thereto by means of screws 55. This indicator member is provided with an annular upstanding flange 56. This flange 56 preferably carries a plurality of pointers or arrows 57 on its outer surface. These arrows or pointers are adapted to cooperate with a plurality of chart sections 58 which are formed on the outer surface of a chart member 59 which is of annular form. The member 59 is secured on the upper end of the tower by means of a pin 60 threaded into the bearing member 45. The lower edge of the member 59 is offset as indicated at 61 so that the rotatable indicator 56 may have its outer surface flush with the chart member 59. If desired, an annular glass member 62 may be secured in position to cover the indicator 56 and the chart member 59. This member 62 may be provided with partition lines 62a to divide the four chart sections 58 to emphasize that all four calibrated sections are separate. It will be apparent that the member 59 is stationary while the member 56 is rotatable. If desired, the members 56 and 59 may be translucent and lights 63 may be disposed within the upper end of the tower as indicated in Figure 6.

As previously indicated, a plurality of pointers 57 are provided on member 56 and a plurality of chart sections 58 are provided on member 59. Any suitable number may be provided although I preferably provide four chart sections and four cooperating pointers. It will be apparent that at least one chart section and one pointer can be seen from any position around the scale.

In the operation of this indicating mechanism, it will be apparent that when the beam is in balanced position, the rocker arm 28 will be vertical and, consequently, the shaft 37 will be in its initial position where the pointers 57 will point to the balanced or zero position on the chart sections 58. However, when the ends of the beam move away from balanced position, the rocker arm 28 will swing away from vertical. This will exert a push or pull on the link 33 which will cause the shaft 37 to rotate. Since the shaft 37 rotates, the indicator member 56 will also rotate and the pointers 57 will cooperate with the chart sections 58 to indicate whether the beam is in overweight position or underweight position.

It will be apparent that the rocker arm 28 is directly above the fulcrum point of the beam. Thus, the rocker arm will swing equal distances on either side of the vertical plane passing through the fulcrum axis. This minimizes the arc of travel of the upper end of the rocker arm which decreases the difficulty of making a proper connection between the arm 28 and the shaft 37. By placing the vertical shaft 37 to one side of the fulcrum, this swing of the rocker arm across the fulcrum axis is made possible. Furthermore, I have provided a simple connection for changing the rocking movement of the arm 28 into a rotative movement of the shaft 37. Although I prefer that the member which carries the pointers rotate relative to the chart member, it is possible to reverse this arrangement. Thus member 56 may be the stationary member while member 59 may be the rotatable member.

In Figures 7 to 10, inclusive, I have illustrated four different shapes which the cooperating rotatable indicator and the stationary charts may take. However, it is to be understood that various other shapes may be employed. In all cases the indicator is so arranged that it may be viewed from any position around the scale.

It will be apparent from the above description that I have provided a scale structure having many desirable features. The indicator can be viewed from any point around the scale. The indicating mechanism and the operating means provided therefor are simple and efficient and are of such a nature that the indicating mechanism will be very active. The indicating mechanism and the operating means therefor are composed of a minimum number of parts so that friction and wear will be reduced to a minimum. Expansion and contraction of the parts caused by changes in temperature will have substantially no effect on the operation of the indicating mechanism. It will also be apparent that I have provided resistance elements associated with the beam tending to maintain it in balanced position which are arranged in a novel and effective manner. Furthermore, I have provided a novel and efficient type of check rod structure.

Many other objects and advantages will be apparent from the preceding description, the drawings and the following claims.

Having thus described my invention, what I claim is:

1. In a weighing scale, a beam fulcrumed for movement in a vertical plane, an arm carried by said beam and disposed substantially perpendicular thereto, said arm being supported by the beam in the same vertical plane with the fulcrum point thereof, indicating means, a rotatable shaft for operating said indicating means, said rotatable shaft being vertically disposed at a point spaced longitudinally of the beam from the vertical plane in which the fulcrum of the beam is disposed, said shaft being supported independently of the beam, and a push-and-pull connection for connecting said arm to said shaft so that rocking of said arm caused by movement of the beam will produce rotation of said shaft.

2. In a weighing scale, a beam fulcrumed for movement in a vertical plane, an arm carried by said beam and disposed substantially perpendicular thereto, said arm being supported by the beam in the same vertical plane with the fulcrum point thereof, indicating means, a rotatable shaft for operating said indicating means, said rotatable shaft being vertically disposed at a point spaced longitudinally of the beam from the vertical plane in which the fulcrum of the beam is disposed, said shaft being supported independently of the beam, and means for connecting said arm to said shaft so that rocking of said arm caused by movement of the beam will produce rotation of said shaft, said means comprising a crank arm keyed to said arm and a crank arm keyed to said shaft, and a rod pivoted to each of said crank arms for connecting them together.

3. In a weighing scale, a beam fulcrumed for movement in a vertical plane, an upwardly extending arm carried by said beam and disposed substantially perpendicular thereto, said arm being supported by the beam in the same vertical plane with the fulcrum point thereof, indicating means, a rotatable shaft for operating said indicating means, said rotatable shaft being vertically disposed at a point spaced longitudinally of the beam from the vertical plane in which the fulcrum of the beam is disposed, said shaft being supported independently of the beam, a pin-and-cup bearing for rotatably supporting the lower end of the shaft and an anti-friction bearing for supporting the upper end of said shaft, and means for connecting said arm to said shaft so that rocking of said arm caused by movement of the beam will produce rotation of said shaft.

4. In a weighing scale, a beam fulcrumed for movement in a vertical plane, an upwardly extending arm carried by said beam and disposed substantially perpendicular thereto, said arm being supported by the beam in the same vertical plane with the fulcrum point thereof, indicating means, a rotatable shaft for operating said indicating means, said rotatable shaft being vertically disposed at a point spaced longitudinally of the beam from the the vertical plane in which the fulcrum of the beam is disposed, said shaft being supported independently of the beam, a pin-and-cup bearing for supporting the entire weight of said shaft arranged at the lower end of the shaft, a ball bearing for rotatably supporting the upper end of said shaft, said shaft being free to move relative to said ball bearing to permit expansion and contraction thereof, and means for connecting said arm to said shaft so that rocking of said arm caused by movement of the beam will produce rotation of said shaft.

THOMAS B. FLANAGAN.